April 13, 1971  W. L. FINLAY ET AL  3,574,609
PROCESS FOR DISPERSOID STRENGTHENING OF COPPER
BY FUSION METALLURGY AND PRODUCTS THEREOF
Filed June 9, 1967  3 Sheets-Sheet 1
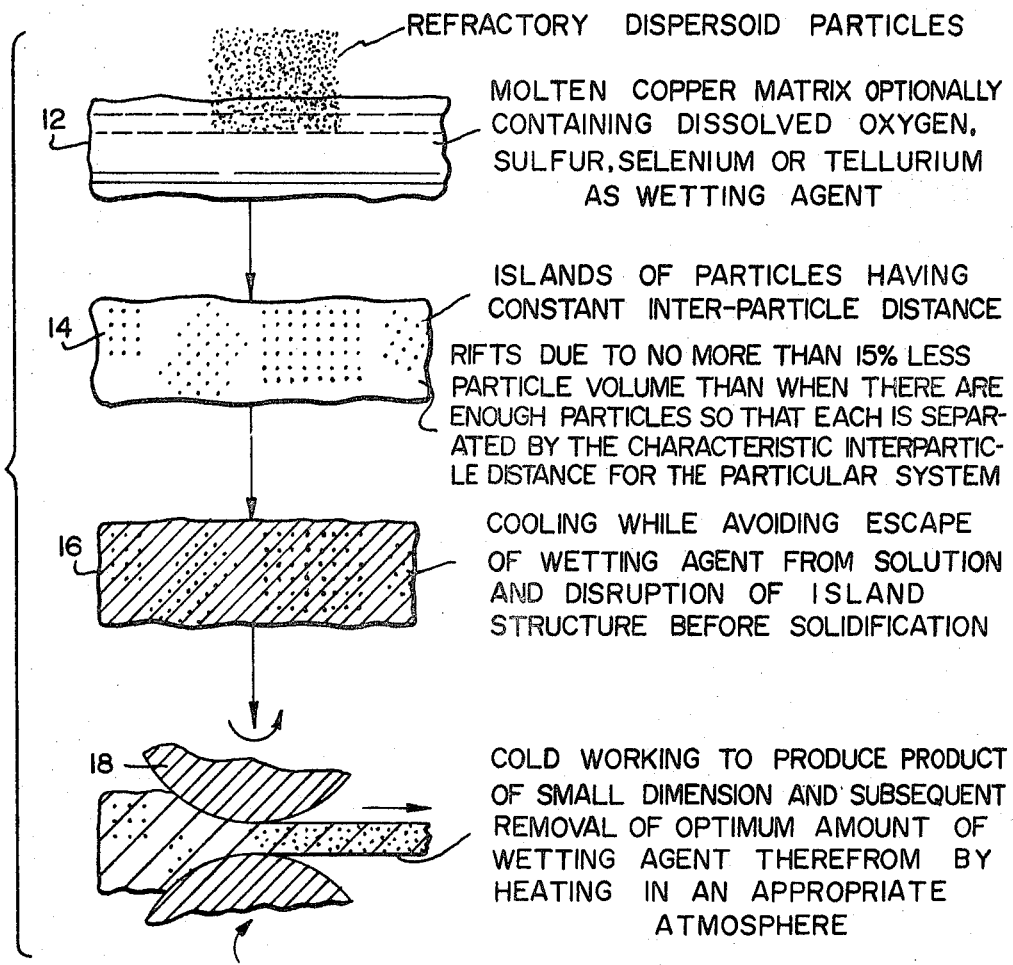
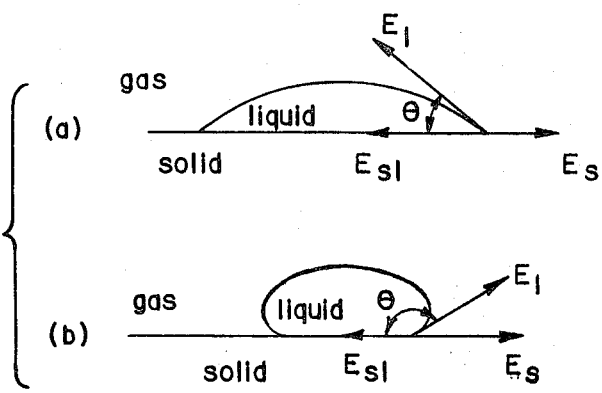
INVENTORS
Walter L. Finlay
BY Donald A. Hey
Morse, Altman & Oates
ATTORNEYS PLOT OF $f = \dfrac{.524 d^3}{(D+d)^3}$, WHERE $f = V\%/100$ (a)

(b)

(c)

(d)

United States Patent Office 3,574,609
Patented Apr. 13, 1971

3,574,609
PROCESS FOR DISPERSOID STRENGTHENING OF COPPER BY FUSION METALLURGY AND PRODUCTS THEREOF
Walter L. Finlay, New York, N.Y., and Donald A. Hay, Medfield, Mass., assignors to Copper Range Company, New York, N.Y.
Filed June 9, 1967, Ser. No. 644,954
Int. Cl. C22c 9/00, 1/02
U.S. Cl. 75—153                                    26 Claims

ABSTRACT OF THE DISCLOSURE

In the production of dispersoid strengthened copper by fusion metallurgy, for a particular copper matrix-dispersoid particle system characterized by particular spatial and wetting relationships, requirements for stable and uniform equilibrium are indicated when the system is molten and when the system is solidifying and solidified. In the molten system, for the given wetting relationships, establishment of such equilibrium has been found to be a function of spatial relationships among size, separation and volume concentration of the particles. In the solidifying and solidified system, for the given spatial relationships, maintenance of such equilibrium has been found to be a function of system composition as determinative of the wetting relationships.

BACKGROUND OF THE INVENTION

The present invention relates to metallurgy and, more particularly, to the production of metallurgical compositions involving a continuous phase or matrix and a dispersed phase or dispersoid. More particularly, the persent invention relates to "stable dispersoid strengthened composite materials in which a relatively soft copper matrix provides at least one desired characteristic and a relatively hard refractory dispersoid provides at least another desired characteristic. Of all available materials, copper generally offers the best combination of lowest cost and highest electrical conductivity with adequate strength and corrosion resistance. Moreover, its strength can be greatly increased by cold working with virtually negligible reduction in electrical conductivity. In practice, cold worked, commercially pure copper constitutes the optimum choice for electrical conductors requiring higher strength than that of annealed copper at room temperature. On the other hand, the strengthening effect of cold work is gradually lost by heating via atomic phenomena known as "recovery" and "recrystallization." In pure copper, these phenomena occur below the service temperatures and times increasingly desired in modern electrical machinery, i.e. higher hot creep strength is required.

In accordance with known techniques, hot strength can be obtained by solid solution hardening or precipitation hardening. With the former, electrical conductivity is drastically lowered. With the latter, as temperature and/or time increase, the hardening precipitate returns to solution in the metal matrix so as drastically to lower electrical conductivity. The present invention involves another technique, called stable dispersoid strengthening, which, as is well known, involves a uniform distribution of very small particles throughout the metal matrix. These particles are "stable" in that they essentially are insoluble in both solid and molten metal and, hence, cannot reduce electrical conductivity by solid solution. But these particles are sufficiently small and numerous to block effectively the atomic rearrangements that constitute recovery and recrystallization. As a result, these particles maintain the deirable strain hardening of cold work or the like (desirable because of strengthening plus minimal effect on electrical conductivity) from room temperature to temperatures well above the recovery and recrystallization temperatures of pure copper. Stable dispersoid strenghtening of the foregoing type can be achieved in various ways, including: fusion metallurgy by which the dispersoid particles are mixed into a matrix melt; powder metallurgy by which dispersoid particles and solid matrix particles are mixed and compacted; or by internal reaction involving precipitation of dispersoid particles in a matrix melt by chemical reaction. Of these, fusion metallurgy is most advantageous from the standpoints of enbaling manufacturing procedures of inherently low cost and large, as well as small part, fabrication, and of permitting them ost versatile selection of dispersoid particle compositions and concentrations, while ensuring intimate bonding between the matrix and the dispersoid.

SUMMARY OF THE INVENTION

The primary object of the present invention is the provision of processes and products involving the stable dispersoid strengtening of copper by certain of the following steps: (A) selecting a composition of molten matrix and refractory dispersoid for given wetting relationships, (B) establishing a stable equilibrium between a given volume percent concentration of the dispersoid and a given volume percent concentration of the matrix, and (C) solidifying the composition while maintaining the stable equilibrium by controlling the composition predeterminedly, and, where necessary, before of after cold working, conditioning the composition in order to provide final properties.

The steps of selecting materials for given wetting relationships is based upon the finding that generally, if a stable equilibrium is to be achieved, the molten matrix must "wet" the refractory dispersoid, i.e. adhesive bonding forces between the matrix and the dispersoid must be greater than cohesive bonding forces within the matrix or between the dispersoid particles. When wetting is substantially perfect as in the case of pure copper and certain dispersoid compositions (i.e. when the molten copper spreads spontaneously and completely over the surfaces of the dispersoid), this disclosure teaches that there is an optimum volume percent of matrix and dispersoid required for optimum stable dispersoid strengthening. When wetting is less than perfect, the system is characterized by the usual measure of the degree of wetting, the so-called "wetting angle." It is an object of the present invention to provide, as a wetting agent useful in accordance with the present invention, a member of the class consisting of oxygen, sulfur, selenium and tellurium. It is another object of the present invention to specify the relative degree of wetting needed for such stable equilibrium.

The step of determining volume percent proportions of matrix and dispersoid is based on the finding that there are naturally occurring functional relationships involving wetting angle and separation of the particles. Thus in a particular system of relatively low particle concentration, the particles tend to clump together into "islands," in each of which the particles are uniformly spaced from each other at a naturally occurring distance. In consequence, when the particle concentration is less than a predetermined amount, there are "rifts" between the islands, resulting in a tendency to reduce homogeneity of the composition. It is an object of the present invention to specify the proportion of rifts permissible in achieving desired properties of the composition.

The step of solidifying the composition while maintaining stable equilibrium is based on the finding that, for those systems where perfect wetting is not attained without the assistance of a wetting agent, particles dispersed in the molten matrix tend to agglomerate in the molten matrix or to dross out of the molten matrix as the matrix solidifies, unless solutes in the molten matrix, particularly solutes that function as wetting agents, are precluded from escaping from solution in such a way as to disturb the particle distribution. Thus it is an object of the present invention to reduce the concentration of dissolved gas or other solute in the molten matrix to a point below its solubility in the solid matrix in order to prevent its assuming the form of undissolved bubbles or other agglomerates that physically would tend to disturb the particle distribution. It is another object of the present invention to choose the concentration of such a dissolved gas or other solute in the molten matrix in order to provide a eutectic mixture in which concentration remains constant to the constant eutectic temperature where solidification occurs. And the step of conditioning the solid composition is based upon the fact that, in some circumstances, a dissolved gas or other solute that before solidification necessarily is present as a wetting or other agent, after solidification is consequently present as an undesired contaminant. In the foregoing case where a particular eutectic mixture has been selected for its ability to avoid agglomeration of a dispersoid therewithin, it may be desirable to remove such an agent in order to achieve desirable final physical properties. Thus, it is an object of the present invention to condition the composition after the dispersoid is locked into position by solidification of the matrix in order to achieve desired final properties.

Other objects of the present invention will in part be obvious and will in part appear hereinafter.

The invention accordingly comprises the processes and products involving the several steps and components and the relationships thereamong, which are exemplified in the following disclosure, the scope of which will be indicated in the appended claims.

BRIEF DESCRIPTION OF THE DRAWINGS

For a fuller understanding of the nature and objects of the present invention, reference should be had to the following detailed description, taken in connection with the accompanying drawings, wherein:

FIG. 1 is a flow diagram, illustrating in exaggerated cross-section, certain physical characteristics of a composition undergoing a process in accordance with the present invention;

FIGS. 2(a) and (b) includes diagrams illustrating certain aspects of the concept of wetting angle, which is of significance in comprehending the present invention.

Figure 3:
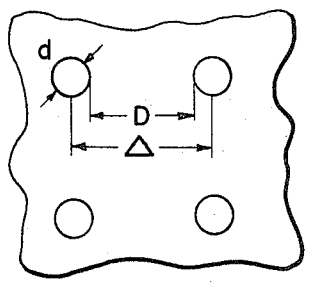
FIGS. 3 and 4 illustrate certain relationships among interparticle spacing, particle diameter and volume percent concentration in accordance with the present invention.

DETAILED DESCRIPTION OF THE INVENTION (A) Selecting a composition of molten matrix and refractory dispersoid for given wetting relationships Stable dispersoid strengthening by fusion metallurgy, i.e. effectively distributing the dispersoid particles in a molten matrix requires that the molten metal "wet" the particles. In some classes of particles, special expedients must be adopted to achieve wetting. Unwetted particles that have been dispersed in the molten matrix by mechanical techniques tend to agglomerate or to gravity separate from the molten matrix.

An explanation of "wetting" is found in the nature of the several bonds possible among the three kinds of pairing possible in the copper-particle matrix, i.e.

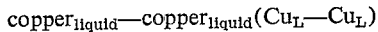

particle—particle ($P_1$—$P_2$) and copper$_{liquid}$—particle ($Cu_L$—P). The nature of such bonding is electrostatic, being the result variously of van der Waals forces, dipole forces, valence forces and co-valent forces. It is believed that wetting of $P_1$ and $P_2$ by $Cu_L$ occurs if the $Cu_L$—P bond is stronger than the $Cu_L$—$Cu_L$ bond. In a system consisting of a liquid and a solid phase, the former will wet the latter to a degree dictated by the surface energies of the system. Such a system is illustrated in FIG. 2 where the surface energies of the system and the wetting angle are indicated. The fundamental relationship is:

$$E_S = E_{SL} + E_L \cos \theta$$

where:
$E_S$=surface energy of the solid
$E_L$=surface energy of the liquid
$E_{SL}$=solid-liquid interface energy
$\theta$=wetting angle The foregoing relationship is a useful approximation. The work of adhesion, W$a$, is a measure of bonding force between the liquid and the solid phase and is defined as:

$$Wa = E_S + E_L - E_{SL}$$

which may be rewritten as:

$$Wa = E_L (1 + \cos \theta)$$

The bonding force between the two phases of the system now can be expressed in terms of the wetting angle and the surface tension of the liquid. As a practical matter, the wetting angle in any particular system can be measured directly on a photograph of the system. It is to be noted that: when $\theta = 90°$, $Wa = E_L$; and when $\theta = 180°$, $Wa = 0$. It is known that $\theta$ varies with the chemical composition of the metallic matrix and with the chemical composition of the particles, and that $\theta$ decreases (and W$a$ increases) with increasing temperature.

In the specific examples hereinbelow, the matrix contains at least fifty percent copper so that copper is at least one of its characteristic ingredients. In the specific examples hereinbelow, the following three types of copper matrix are utilized, it being understood that the follownig formulation merely are illustrative but not restrictive. (1) Electrolytic Tough Pitch (ETP) copper which contains, by total weight in a remainder of copper: combined oxygen in the form of $Cu_2O$ and dissolved oxygen—0.04%; and nickel, iron, bismuth and arsenic—trace. (2) Lake copper, which contains, by total weight in a remainder of copper: from .04 to .089% silver, in addition to the minor proportions of oxygen, nickel, iron, bismuth and arsenic, as specified above in connection with ETP copper. (3) Oxygen free (OF) copper, typically containing by total weight in addition to a remainder of copper approximately: iron—0.0005%; sulfur—0.0025%; silver—0.0010%; nickel—0.0006%; tin—0.0002%; arsenic — 0.0003%; selenium — 0.0002%; tellurium—0.0001%; lead—0.0006%; antimony—0.0002%; manganese—0.0005%; bismuth—0.0001%; and oxygen—0.0002%. When electrical conductivity is not a primary consideration, the matrix in various forms is composed of an alloy of copper.

In general, the stronger the internal chemical bond that holds the atoms of a refractory particle together, the better is the particle for use in dispersoid strengthening but, also, the stronger the internal chemical bond, the more difficult it is to disperse the particles randomly in the molten matrix and to bond them effectively in the solid state. On the other hand, the stronger the external chemical bond that a matrix metal is capable of entering into, the more capable is the matrix metal of "wetting" a given dispersoid particle; but also, the more likely is the matrix metal to harm or destroy a dispersoid particle immersed within it, i.e. to disrupt the internal chemical bond of the particle. Accordingly, the oxide formation as a reference, the dispersoid characteristically contains at least one metal whose negative free energy of oxide formation is numerically greater than 40 kcal./gm. atom of oxygen at 27° C. Metals falling in this category are selected from the class consisting of Ca, Th, Mg, La, Be, Li, Y, Sr, Al, Hf, Ba, Ce, U, Zr, Ti, V, Si, B, Na, Mo, W, Ta, Cb, Mn, Cf, Zn. Desired results are obtained with compounds of the foregoing metals, in the form of sub-micron sized particles, that are essentially insoluble in both the molten and solid states of the matrix. Critically superior results are obtained with compounds of these metals with O, S, Se of Te from Group VIA of the Periodic Table or with B, C, N, Si or P from Groups II and III of the Periodic Table. Desired results also are achieved with particles composed of refractory metals such as Mo, Ta or W and with intermetallic compounds such as $Mo_2$ Zr, The refractory dispersoid, which preferably has a melting point in excess of 2000° F., is in the geometrical form of substantially equiaxial grains or substantially biaxial platelets or substantially uniaxial whiskers, the minimum dimension of any of which is below 10 microns.

The following criteria have been found to characterize the degree of adequacy of wetting, and, therefore, to serve as an index of the dispersibility of particles in the copper matrix. (1) A wetting angle from zero to a point in the range of 10° to slightly less than 20° is associated with excellent dispersability in the molten copper matrix. (2) A wetting angle from a point in the range of 10° to slightly less than 20° to a point in the range from 70° to slightly less than 90° is associated with marginal dispersability in the molten copper matrix. (3) A wetting angle from a point in the range of 70° to slightly less than 90° to a point upwardly thereof is associated with unsatisfactory dispersability in the molten copper matrix. Dispersing the particles in the melt is preferably done at 200–400° F. above the melting point of the matrix metal. The wetting angle criteria cited above refer to this dispersing temperature. In general, the wetting angle increases as the temperature decreases. Unwetting thereby can occur just before solidification. The ideal wetting angle is zero degrees at solidification.

Certain carbides are particularly effective as stable dispersoid strengthening particles, namely, stoichiometric compounds such as $Mo_2C$, TaC, TiC and VC, and carbon deficient compounds (containing less than stoichiometric proportions of carbon) such as $TaC_{.5}$, $TiC_{.5}$ and $VC_{.5}$. The $Mo_2C$ and $TiC_{.5}$ particles are characterized by such low wetting angles in molten copper that no special conditioning of the particles is necessary for stable dispersoid strengthening. In the case of $Mo_2C$, excess carbon may exist in the free state or combined in excess of that stoichiometrically indicated. Or partially oxidized patches may exist on the surface of the carbides. In each of these cases, wetting is inhibited. Such inhibition of wetting by excess carbon may be precluded as in (a) or (b) following. (a) The molten copper is saturated with hydrogen, as by bubbling $H_2$ into the melt. In consequence, for example, a hydrogen reducible oxide patch like $MoO_3$ on the surface of an $Mo_2C$ particle is reduced to a suboxide or to the metallic state, either of which is more wettable than the original oxide. Alternatively, for example, a compound like CH, is formed by hydrogen combining with either free or combined carbon escapes so as to reduce the carbon concentration and increase the wettability of the dispersoid particles in their resulting form. Finally, all hydrogen is removed from solution in the copper melt before solidification, as by pulling a vacuum of the order of 1 mm. Hg, in order to avoid porosity in the final product. (b) The copper is vacuum melted and the dispersoid particles are mixed into the degassed molten copper under a vacuum. In consequence any oxide patches tend to decompose and/or to volatilize, thereby leaving residual particles of increased wettability.

Since, as indicated previously, the more difficultly wettable dispersoids are often the best dispersoids for strengthening purposes, it is desirable that some technique be provided for decreasing their wetting angles. It has been discovered that this desired objective can be attained by conditioning the surface of the more difficultly wettable dispersoid particles with at least a monoatomic or monomolecular layer of elements selected from Group VI–A of the Periodic System. These elements are O, S, Se and Te. It has been discovered that the presence of one of these elements in the interface between a desirable refractory dispersoid particle and the matrix of a metal which does not otherwise wet the particle surface adequately, decreases the wetting angle i.e., increases the degree of wetting. The mechanism of this phenomenon, although not understood with certainty, is thought to be the formation of a copper compound, e.g. $Cu_2O$, which operates as a linkage between the copper and the refractory particle, e.g. $Al_2O_3$, which bonds more strongly to the refractory particle than to the copper atoms or the other copper compound molecules. It has been discovered further that, in the case of some dispersoid-matrix systems, an adsorbed layer of inert molecules insulates the matrix metal from the dispersoid particle surfaces, e.g., dispersoid particles stored normally in air, tend to adsorb nitrogen, oxygen, water and other air molecules on their surfaces. When such particles are immersed in molten copper, for example, the interactions at the interface depend upon the relative degrees of wettability and adsorbitivity of the matrix metal and the adsorbed materials with respect to the dispersoid material. It was indicated above that patches of oxide on particles of certain compounds tend to inhibit their wettability. This aforementioned phenomenon is not inconsistent with the foregoing oxygen wetting phenomenon inasmuch as the former case refers to oxide compounds other than $Cu_2O$ whereas the latter case refers to oxygen in the form of $Cu_2O$ and/or dissolved oxygen.

The above described techniques of interface conditioning are applicable to the foregoing criteria as follows. (1) When the molten metal matrix readily wets the dispersoid, i.e., has a wetting angle of less than a point in the 10°–20° range, it tends to displace inert molecules like nitrogen and to establish complete wetting and excellent dispersing throughout the molten metal. In a copper matrix, for example, such a dispersoid is either $Mo_2C$ or $TiC_{0.5}$, both of which will be discussed below. In such a case no special conditioning of the dispersoid particle surfaces is necessary. (2) If the wettability of the dispersoid by the molten metal is marginal relative to that of an insulating adsorbed molecular film on the dispersoid particle surfaces, then the molten metal may not be able to displace the adsorbed molecules and the desirable concurrence of wetting, dispersing and bonding does not occur. In such a case, proper conditioning of the interface is accomplished in accordance with the present invention by either hot vacuum outgassing or by internal reaction. Hot vacuum outgassing of the dispersoid particles is effected prior to introducing them into the molten metal in order to rid the particle surfaces of insulating layers of adsorbed inert molecules. Somewhat less effectively than hot vacuum outgassing, a minor percentage of a reactive metal like Ti or Zr is added to the matrix metal. When the dispersoid with, for example, $N_2$ adsorbed on its surfaces, is immersed, for example, in 99 weight percent Cu-1 weight percent Ti, the Ti reacts with most or all of the adsorbed $N_2$ and the matrix metal then directly contacts the titanium nitride, or, if the latter has separated from the dispersoid particle surface, the particle surface. To ensure complete reaction, however, some excess reactive metal should be added; the residue would increase the electrical resistivity and, in Cu used for electrical conductors, e.g., this is disadvantageous. (3) In the case of poor wettability between the dispersoid particle and matrix metal, even if all insulating films like adsorbed inert molecules are removed, the wetting angle is still larger than 70°–90° and the desired wetting-dispersing-bonding sequence does not occur. In accordance with the present invention, if such unsatisfactory interfaces are properly conditioned with dispersing agents selected from Group VI–A of the Periodic System, the wetting angle is decreased and, with this, dispersion is correspondingly increased. Here, proper interface conditioning involves both removal of inert adsorbed molecules and the coating of the particle surface with Group VI–A dispersing agents.

(B) Establishing a stable equilibrium between a given volume percent concentration of the dispersoid and a given volume percent concentration of the matrix It has been found that when a relatively small concentration of wettable dispersoid particles is distributed in the molten copper matrix, e.g. a distance between particles more than 1000 times the particle diameter, the particles will aggregate into clumps, in each of which the interparticle spacing is constant and between which the gaps or rifts are of magnitudes that depend on the overall particle concentration. It is postulated that the constant interparticle spacing within any clump results from a balance between the $Cu_L$—P adhesive bonding energies and the $P_1$—$P_2$ cohesive bonding energies. It follows that excellent uniformity of particle dispersion can be achieved, in an appropriate formulation of copper matrix and refractory dispersoid, by a relationship among interparticle spacing, volume fraction and particle size, derived as follows:

With reference to FIG. 3, which shows particles, dispersed as in FIG. 1, greatly magnified, assume a simple cubic lattice with particles of diameter $d$, a lattice spacing of $\Delta$ and an interparticle spacing of D. The lattice constant $\Delta$ is the distance between adjacent particle centers and the interparticle spacing is distance between edges of adjacent particles, which is equal to $\Delta - d$. The volume of spacing in the lattice occupied by one particle is $\Delta^3$ and the volume of the particle is $\frac{1}{6}\pi d^3$. Therefore, the volume fraction $f$ can be stated:

$$f = \frac{\frac{1}{6}\pi d^3}{\Delta^3} = \frac{\frac{1}{6}\pi d^3}{(D+d)^3}$$

or $$f^{1/3} = \frac{.81d}{D+d}$$

The interparticle spacing D essentially is a constant at any given temperature for each specific dispersoid-particle molten-matrix system. Reference to the above relationship shows that, with D fixed, either $d$ or $f$ but not both can be varied simultaneously. Thus, with D fixed by nature for a particular system and with $d$ selected as desired for particular final properties, there is only one volume fraction $f$ that satisfies the above relationship. When the volume fraction is greater than that indicated by the foregoing, a certain amount of non-uniformity occurs in localized regions of the system. This non-uniformity may be called "rifting" in reference to the rifts or essentially particle-free regions between the islands of the system with relatively uniform particle distribution as illustrated in FIG. 1.

Figure 4:
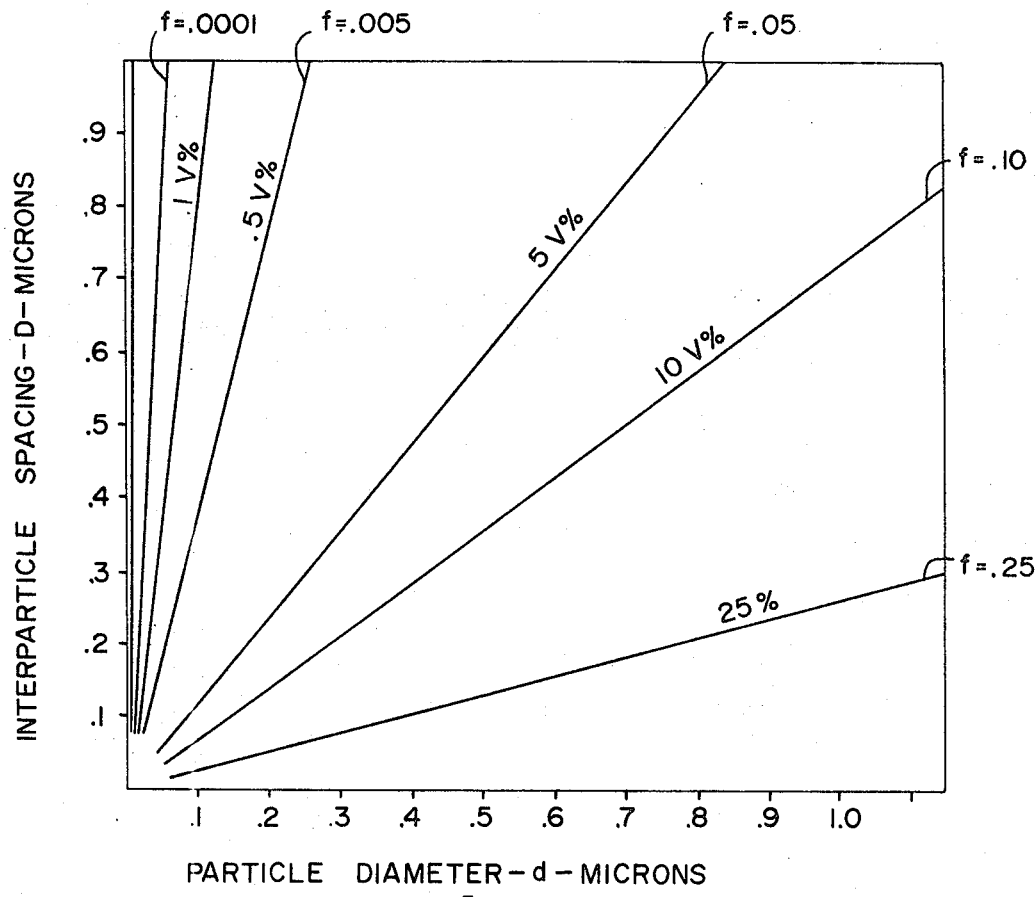

FIG. 4 illustrates a plot of volume fraction $f$ as a function of interparticle spacing D and particle diameter $d$, both in microns, in accordance with the foregoing relationship. With reference to this plot volume fraction concentrations in excess of $f=.25$ are represented by the most clockwise wedges and smaller concentrations are shown as being represented by the wedges disposed in counterclockwise succession to the most counterclockwise wedge in which volume fraction concentrations less than $f=.0001$ are represented. In using the foregoing plot, it is to be appreciated that generally; conductivity decreases as volume percent concentration of (low conductivity) dispersoid increases; formability and ductility of the composite in general decrease as volume percent concentration of dispersoid increases; and dispersoid strengthening increases as volume percent concentration of dispersoid increases. Thus the pertinent criteria of D, $d$ and $f$ combine to establish a desirable combination of such factors as conductivity, strength, ductility, formability and cost for a particular application. For example:

where strength is an over-riding consideration and formability can be sacrificed to some extent, a volume percent in the 5 to 10% range may be effected; where 0.5 micron diameter particles can be made at one tenth the cost of 0.1 micron diameter particles, the same interparticle spacing can be attained by using a corresponding large volume percent of the coarser particle while saving cost; and so forth. Accordingly, generally particle diameters below about 0.9 micron and volume percents below about 10%, are contemplated in accordance with the present invention. Any rifting, i.e. the existence of portions of the composite that are largely dispersoid-particle-free, reduces the over-all dispersoid strengthening properties. Rifting up to about 15 volume percent can be tolerated without undue loss of dispersoid strengthening properties, but more than this should be avoided. Since interparticle spacing less than the lower limit of the .5 to 1 micron range can give excellent dispersoid strengthening properties, it is advantageous in some cases to disperse, in the molten copper, particles of a particular diameter in a greater amount that that which gives the characteristic interparticle spacing. In accordance with the FIG. 4 relationship, this greater amount means that the actual interparticle spacing will be less than the characteristic interparticle spacing. Thus, so long as the desideratum of good wetting taught by this invention obtains, selection of an interparticle spacing, say, no less than one hundred angstroms is contemplated herein.

Figure 5:
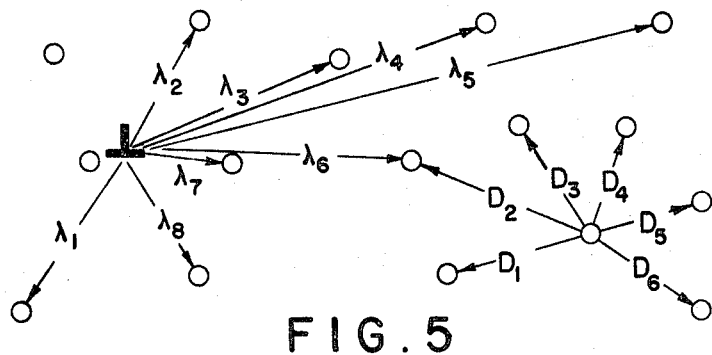
FIGS. 5 and 6 illustrate the concept of mean free path and its relationship to interparticle spacing.
Figure 6A:
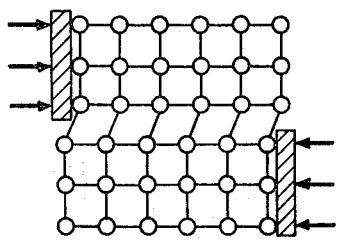
Figure 6B:
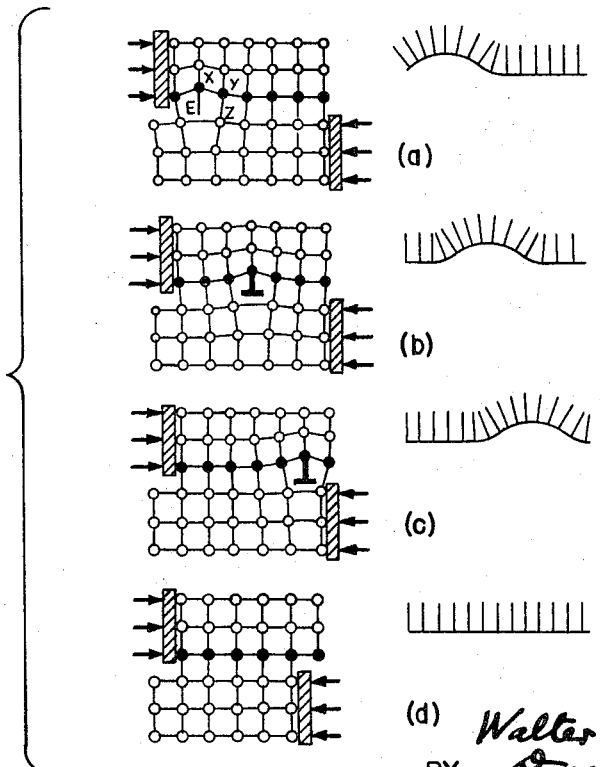

FIGS. 3 and 4, and the foregoing discussion of the relationship among particle diameter, interparticle spacing, and volume percent of dispersoid particles, and the claims which involve this relationship, adequately define the amount and distribution of the dispersoid phase. To make this invention more clear, however, another concept with a more directly interpretable physical significance than that of interparticle spacing will be introduced. It is "mean free path" and can best be decribed by referring to FIG. 5. Interparticle spacing D was defined earlier. In the two-dimensional array of particles in FIG. 5, D is seen to be the shortest distance between the edge of adjacent particles. Mean free path $\lambda$ is seen to be the average of all the straight paths to adjacent particles. $\lambda$ is considerably larger than D. Its physical significance can be seen by reference to FIG. 6. FIG. 6A represents a perfect metal lattice being deformed by a shearing force. The atoms in each plane move as a group and the theoretical maximum stress is required to deform the lattice. Actually, all metal lattices of engineering size contain many "disclocations," or planes of dislocated (improperly placed relative to a perfect lattice) atoms such as that indicated by X–E in FIG. 6Ba. Like a wrinkle in a rug, this dislocation can be moved across the lattice one atom at a time (in the plane of the paper) as in FIG. 6Bb, c, and d with much less stress than if all the atoms moved at once as in FIG. 6A. The symbol for a disclocation is the mark $\bot$, the vertical representing the extra row of atoms and the horizontal representing the slip plane. In FIG. 5 a dislocation is shown as having just cleared the particle at the far left. $\lambda$'s, rather than D's, are the paths available to the dislocation for movement before encountering another particle. The amount and distribution of particles are adequately and more simply described by D; but $\lambda$ more closely describes the atomic mechanism of deformation and the role dispersoid particles play in strengthening metals by blocking movements of dislocations.

(C) Solidifying the composition while maintaining the stable equilibrium by controlling the composition predeterminedly and, before or after cold working, modifying the composition in order to provide final properties.

As indicated above, although some refractory particles such as $Mo_2C$, are wet by the copper matrix (having a wetting angle of approximately 0° at 1200° C.), many otherwise desirable refractory particles are not so wet. In the case of some marginally wettable particles, which are nonwettable primarily because of adsorbed atmospheric nitrogen molecules or noble gas atoms, wettability can be increased to a satisfactory level, for example, by the steps of hot vacuum outgassing to remove the gas molecules and atoms and backfilling with a non-contaminant such as may be selected from the Group VI-A class consisting of oxygen, sulfur, selenium and tellurium, the last three being in gaseous compound form such as $H_2S$ for sulfur; alternatively, the Group VI-A wetting-dispersing agent may be dissolved in the molten copper matrix before the dispersoid particles are introduced into the copper. Special care must be taken to control the presence of such a Group VI-A element during solidification. Specifically, if this element is present in greater than its solid solubility in the copper matrix, it tends to escape from solution and to disrupt the uniformity of the dispersion before solidification. When the initial concentration in solution of the Group VI-A element is below its maximum solid solubility concentration, no special step to reduce its concentration is necessary. Such minimum concentration, however, often does not achieve optimum wetting and the concentration must be increased.

When the initial concentration of the Group VI-A element is greater than its maximum solid solubility concentration, this concentration can be lowered without excessive evolution of a gas within the matrix. Lowering of concentration is achieved preferably by reacting the dissolved element in solution with reactive metal capable of forming in situ an inert particulate material that remains in the composite material in addition to the original dispersoid. In general such a reactive metal is more active than the matrix metal. In the case of copper, the negative free energy of combination with the dissolved non-metal is greater for the reactive metal than for copper. Specifically such reactive metals include aluminum, zirconium, titanium, calcium, lithium, magnesium, vanadium, chromium, manganese, niobium, tantalum, silicon, aluminum, hafnium and beryllium. Also, the active metal must not boil or have an appreciable vapor pressure below approximately 2000° F., a typical temperature of molten copper. While, in general, the use of an active metal is preferred, as stated above, to reduce the concentration of the dispersing agent, it has been found also convenient at times similarly to use reactants other than metals. For example, in the case where oxygen or copper oxide is the dispersing agent, it is possible to use deoxidizing agents such as C, CO, H, $Cu_2S$, P, etc. Where, for example, S or $Cu_2S$ is used as the dispersing agent, reactants like $Cu_2O$ may be used. Again, as stated above, it is desirable to avoid an excess of reactants like P, which when remaining in solution, lower conductivity. Moreover, although some agitation has been found useful to secure and maintain good uniform dispersion, excessive agitation from gaseous reactants should be avoided to minimize the tendency toward agglomeration.

In the case of difficultly wettable particles such as $Al_2O_3$, as indicated above, Group VI-A elements selected from the class consisting of oxygen, sulfur, selenium and tellurium function as wetting agents. It is to be understood that the above described principles, namely (A) composition selection for wettability and (B) volume concentration selection for dispersion uniformity, are applicable to the just described system in which wettability is enhanced by a wetting agent, it having been found that island formation by the dispersoid occurs both in the absence and the presence of such a wetting agent. A problem, however, is encountered when solidification occurs and it is necessary for good melting and dispersing that the wetting agent be present in amounts greater than that of its maximum solid solubility in copper during solidification. Group VI-A elements form simple terminal eutectic systems with copper. On the copper-rich (hypo-eutectic) side of the eutectic point, primary crystallites of copper first form on solidification, rejecting the Group VI-A element to the remaining liquid. It has been discovered that the wetted refractory material, e.g. $Al_2O_3$ in a 99.9% Cu–0.1% $O_2$ matrix, prefers to remain with the rejected liquid and its high wetting agent content. When this residual liquid finally solidifies, a network of eutectic structure forms, surrounding the largely particle-free primary copper grains (which are largely free of the wetting agent). In such a case, the dispersoid is badly segregated and dispersoid strengthening is less than desired.

A solution to the foregoing problem has been found. In accordance with the present invention, the overall composition of the system is chosen to be eutectic and therefore free throughout solidification of primary crystallites of copper, so that there are no regions free of the dispersoid. The eutectic composition of the Group VI-A elements which give a primary-crystallite-free eutectic structure with pure copper are, by total weight percent of the copper matrix: oxygen—0.39%; sulfur—0.77%; selenium—2.2% and tellurium—8.2%.

Oxygen and sulfur are seen to be in relatively low concentration in their eutectic compositions but are in undesirably high concentration from the standpoints of optimum formability, ductility, toughness and thermal and electrical conductivities. Fortunately, however, in many important products, such as wire, bar, sheet and tube, the final section thicknesses are thin enough to permit removal, while in the solid state, of the Group VI-A element at some penultimate thickness, thereby permitting a final reduction for grain size and dimension control. For example, heating in hydrogen, and particularly in hydrogen saturated with water vapor, removes oxygen or sulfur from solid copper. This controlled removal of the wetting agent can be carried to any desired degree. In the extreme case, the wetting agent can be removed completely. However, best bonding of the refractory dispersoid to the solid copper matrix is achieved when the wetting agent is retained in an amount between 0.01 to 0.25% based on weight of the copper matrix.

An illustrative overall process of the present invention is shown in FIG. 1 as comprising the steps of: mixing refractory dispersoid particles 10 with a molten copper matrix 12, containing a dissolved member of the class consisting of oxygen, sulfur, selenium and tellurium; selecting the volume percent concentration of the dispersoid to be more than minus 15% of the volume percent concentration at which the interparticle distance generally is the "characteristic interparticle distance" which is the same as the interparticle distance naturally occurring in islands 14, which would form if the dispersoid were present in less than the amount calculated from the relationship given above in reference to FIG. 3; cooling the composition as at 16 in such a way as to avoid escape of the dissolved wetting agent from solution before solidification and consequent disruption of the island structure; and cold working as at 18 the composition to impart strength and to reduce thickness enough to permit optimum removal of the wetting agent to provide desired combinations of strength and conductivity. It is to be understood that certain of the foregoing steps are significant per se or in combination with other steps not specifically shown in FIG. 1.

SPECIFIC EXAMPLES

The following non-limiting examples will further illustrate the present invention:

Example 1

A mixture of ETP copper (see formulation above; note particularly that this grade of copper contains about 0.04 weight percent oxygen) particles and $Mo_2C$ particles, which are known to be characterized, when in contact with pure molten copper at 1200° C., by a substantially 0° wetting angle, and at 1100° C., just above the solidification temperature of Cu, by about a 20° wetting angle, is selected as follows. It has been found that $Mo_2C$ particles dispersed in a melt have an approximate, naturally occurring, characteristic interparticle spacing, D, in the range of 0.5 to 1 micron. From the equation discussed in detail in section (A) above and assuming D to be 1 micron:

$$f^{1/3} = \frac{.81d}{D+d}$$

Selecting a 0.1 micron diameter of the $Mo_2C$ particles:

$$f^{1/3} = \frac{.81 \times 0.1}{1.1} = .073$$

$$f = (7 \times 10^{-2})^3 = .00035$$

This means that the volume percent of $Mo_2C$ should be approximately 0.03% and that the volume percent of the ETP copper should be approximately 99.97%. For an interparticle spacing of .5 micron, the volume percent of $Mo_2C$ should be about 0.25%. The mixture, selected on the foregoing basis, is heated to 1200° C., at which temperature the $Mo_2C$ particles become dispersed in the molten copper. Before cooling the composition, less than a stoichiometric quantity of sulfur to react with the oxygen dissolved in the copper is gradually added to the melt in order to reduce the original 0.04% oxygen concentration by total weight of the matrix, to a concentration of approximately 0.01%. Since the solid solubility of oxygen in copper at solidification is approximately 0.01%, by total weight of the copper, the uniformity and stability of the dispersion are maintained after casting during solidification. Then the composition is cooled to room temperature and worked by compression in one dimension approximately 45%. The resulting composition, which retains high conductivity, shows no substantial softening at 800° F. after several hours and is not yet fully soft by 950° F. after several additional hours. In contrast, ordinary copper starts to soften at 400° F. and is fully soft by 570° F.

Example 2

The process of Example 1 is repeated except that the diameter of the $Mo_2C$ particles is chosen at 0.5 micron. Thus $$f^{1/3} = \frac{.81 \times 0.5}{1.5} = .27$$

$$f = (2.7 \times 10^{-2})^3 = .0197$$

This means that the volume percent of $Mo_2C$ should be approximately 2.0% and that the volume percent of the ETP copper should be approximately 98.0%. For a characteristic interparticle spacing of 0.5 micron, the volume percent of $Mo_2C$ should be about 6.65%. The mixture selected on the foregoing basis, when melted, cooled, deoxidized and worked, as in Example 1, results in a high conductivity and high strength metal.

Example 3

The proportions and materials of the process of Example 1 are repeated. However, the step of reducing the oxygen concentration to less than 0.01% by sulfur addition is sudden. In this case, bubbles of $SO_2$ form and profusely and violently agitate the melt before solidification occurs. As a result, some of the dispersoid, after being attracted to the bubbles, is carried from the molten matrix by the bubbles. In the resulting product, markedly less strengthening occurs than the product of Example 1.

Example 4

The process of Example 1 is repeated except that Lake Copper replaces ETP copper, the end result being closely similar to the result in Example 1.

Example 5

Eutectic proportions of Cu and $Cu_2O$ powder are mixed with $Al_2O_3$ powder. The Cu and $Cu_2O$ particles generally are less than 100 mesh and the $Al_2O_3$ particles generally have a sub-micron diameter. The Cu matrix and $Al_2O_3$ normally would have a contact angle in excess of 90° but the presence of oxygen in the matrix reduces the contact angle to below 20°. The volume percent concentration of the dispersoid is approximately 2% and the volume percent concentration of the matrix is the remainder. The mixture is heated to 1200° C., at which temperature the copper matrix is more than 100° C. above its melting point and the particles are dispersed. Next the composition is cooled until solidification occurs and the solid composition is cold worked to 50% of one of its dimensions to provide a product having a thickness of ⅛ inch. The product is subjected to a wet hydrogen atmosphere at approximately 800° C., in consequence of which reduction of dissolved oxygen is effected to the order of 0.1 to 0.2 weight percent of the matrix. Further cold working another 50% results in high strength and high conductivity of the product.

Example 6

The process of Example 5 is repeated except that the concentration of the $Cu_2O$ is reduced to one-fourth i.e. to about 0.10 weight percent. During solidification, the dispersed particles are swept into a eutectic network, in consequence of which the original uniform dispersion is destroyed before complete solidification occurs. In the resulting product, markedly less strengthening occurs than in the product of Example 5.

Example 7

An attempt is made to stir mechanically 2 parts of $Al_2O_3$ into 100 parts of oxygen free commercial copper, which is molten at 1200° C. Segregation of the $Al_2O_3$ immediately occurs at the surface of the melt, i.e. the $Al_2O_3$ is not wetted by the molten copper and floats to the surface.

Example 8

The process of Example 7 is repeated except that 0.77 weight percent sulfur is added to the melt. A uniform dispersion of the $Al_2O_3$ occurs.

Example 9

The process of Example 1 is repeated except that the ETP copper is replaced by substantially pure copper. Since $Mo_2C$ is well wetted by copper even in the absence of a wetting agent such as oxygen, which occurs in the ETP copper of Example 1, uniform dispersion in the molten copper occurs. Although, maintenance of the dispersion on solidification is not as effective as in the case where at least a trace of oxygen is present, the desirable properties of the resulting product at least approach those of the product of Example 1.

Example 10

The process of Example 1 is repeated except that Mo replaces $Mo_2C$, the resulting product being similar to that to Example 1.

Example 11

The process of Example 1 is repeated except that $TaC_{.8}$ replaces $Mo_2C$, the resulting product being similar to that of Example 1.

Example 12

The process of Example 1 is repeated except that $TiC_{.5}$ replaces $Mo_2C$, the resulting product being similar to that of Example 1.

Example 13

The process of Example 1 is repeated except that $VC_{.7}$ replaces $Mo_2C$, the resulting product being similar to that of Example 1.

Example 14

The process of Example 1 is repeated except that W replaces $Mo_2C$, the resulting product being similar to that of Example 1.

Example 15

The process of Example 1 is repeated except that Mo₂Zr replaces Mo₂C, the resulting product being similar to that of Example 1.

CONCLUSION

The present invention thus provides processes for and products of dispersing refractory particles in a copper matrix uniformly and maintaining the uniformity of the dispersion during solidification. Important specific features of the invention include utilizing Group VI-A elements as wetting agents, establishing a particle concentration more than minus 15% of calculated norm, solidifying while preventing solute transfer in the matrix and reduction of solute concentration in the matrix following solidification. Since certain changes may be made in the foregoing disclosure without departing from its scope, it is intended that all matter described in the foregoing specification and shown in the accompanying drawings be interpreted in an illustrative and not in a limiting sense.

What is claimed is:

1. A process for producing a dispersoid strengthened copper composition, said process comprising the steps of wetting an actual volume concentration of refractory dispersoid particles in a molten matrix containing copper as its characteristic ingredient, said dispersoid characteristically containing at least one metal whose negative free energy of oxide formation is numerically greater than 80 kcal./gm. atom of oxygen at 27° C., said dispersoid particles and said molten matrix being characterized by a naturally occurring characteristic relationship among a predetermined characteristic particle diameter, a predetermined characteristic interparticle spacing and a predetermined characteristic volume concentration, said characteristic volume concentration being such that $$f = (\tfrac{1}{6}\pi d^3)/D+d)^3$$

where $f$=actual volume fraction of said dispersoid, $d$=actual average particle diameter, and $D$=actual average interparticle spacing, said particles of said dispersoid when in low theoretical volume concentration relative to said predetermined characteristic volume concentration naturally collecting into islands within which said predetermined characteristic interparticle spacing occurs and between which a predetermined inter-island rifting occurs, said characteristic relationship being such that, when said dispersoid particles are of said predetermined characteristic particle diameter, said predetermined characteristic interparticle spacing and said predetermined characteristic volume concentration, no inter-island rifting occurs, said actual volume concentration being in a range having an upper limit such that the actual interparticle spacing is no less than one hundred angstroms and a lower limit such that said actual volume concentration is no less than 15% below said predetermined characteristic volume concentration, and cooling said molten matrix to produce homogeneous solidification without disturbing said actual interparticle spacing.

2. The process of claim 1 wherein the dispersoid is a compound of an element selected from the class consisting of O, S, Se, Te, B, C, N, Si and P.

3. The process of claim 1 wherein the dispersoid is a carbon deficient carbide containing less than stoichiometric proportions of carbon.

4. The process of claim 1 wherein the dispersoid particles are characterized by a volume concentration of at most 10%.

5. The process of claim 1 wherein the dispersoid is Mo₂C, wherein the C thereof ranges in concentration stoichiometrically from deficient to complete.

6. The process of claim 1 wherein the dispersoid is TiC, wherein the C thereof ranges in concentration stoichiometrically from complete to deficient.

7. The process of claim 1 wherein the dispersoid is VC, wherein the C thereof ranges in concentration stoichiometrically from complete to deficient.

8. The process of claim 1 wherein the dispersoid is tungsten carbide, wherein the C thereof ranges in concentration stoichiometrically from complete to deficient.

9. The process of claim 1 wherein said wetting is effected under a vacuum.

10. The process of claim 1 wherein said wetting is effected under a hydrogen atmosphere.

11. The process of claim 1 including the step of at least partially remelting following solidification.

12. A process for producing a dispersoid strengthened copper composition, said process comprising the steps of wetting an actual volume concentration of refractory disperiod particles in a molten matrix containing copper as its characteristic ingredient, said disperiod particles and said molten matrix being characterized by a naturally occurring characteristic relationship among a predetermined characteristic particle diameter, a predetermined characteristic interparticle spacing and a predetermined characteristic volume concentration, said particles of said dispersoid when in low theoretical volume concentration relative to said predetermined characteristic volume concentration naturally collecting into islands within which said predetermined characteristic interparticle spacing occurs and beween which a predetermined interisland rifting occurs, said characteristic relationship being such that, when said disperoid particles are of said predetermined characteristic particle diameter, said predetermined characteristic interparticle spacing and said predetermined characteristic volume concentration, no inter-island rifting occurs, said actual volume concentration being in a range having an upper limit such that the actual interparticle spacing is no less than one hundred angstroms and a lower limit such that said actual volume concentration is no less than 15% below said predtermined characteristic volume concentration, cooling said molten matrix to produce homogeneous solidification while avoiding substantial change in the condition of solubility of any solute in said matrix in order to prevent such a substantial change from disturbing said interparticle spacing, and conditioning said composition including working said composition after solidification in order to produce a percentage change in at least one dimension thereof, said step of conditioning said composition including reducing, before solidification, the concentration of any solute within said matrix to a concentration below its solid solubility at the solidification temperature in said matrix, said step of conditioning including, after solidification, reducing any solute within said matrix to a lower concentration than originally existing, said solute being selected from the class consisting of oxygen, sulfur, selenium and tellurium, said dispersoid characteristically containing at least one metal whose negative free energy of oxide formation is numerically greater than 40 kcal./gm. atom of oxygen at 27° C., said dispersoid being a compound of an element selected from the class consisting of O, S, Se, Te, B, C, N, Si and P, said dispersoid particles being characterised by at least one dimension of at most 0.9 micron and a volume concentration of at most 10%, said characteristic volume concentration being such that $f=(\tfrac{1}{6}\pi d^3)/(D+d)^3$, where $f$=actual volume fraction of said dispersoid, $d$=actual average particle diameter, and $D$=actual average interparticle spacing.

13. A process of producing a dispersoid strengthened copper composition, said process comprising the steps of making a predetermined concentration of refractory dispersoid particles and a molten matrix containing copper as its characteristic ingredient, said molten matrix containing dissolved therein a member of the class consisting of oxygen, sulfur, selenium and tellurium wetting agent for said refractory disperoid by which a dispersion of said dispersoid is effected, cooling said molten matrix to produce homogeneous solidification while avoiding substantial change in the condition of solubility of said wetting agent in the matrix in order to prevent such a substantial change from disturbing the dispersion, and conditioning said composition including working said composition after solidification in order to produce a percentage change in at least one dimension thereof, the step of conditioning the composition including reducing, before solidfication, the concentration of any solute within said matrix to concentration below its solid solubility in said matrix at the solidification temperature, the step of conditioning including after solidification, reducing said wetting agent within said matrix to a lower concentration than originally existing, said dispersoid characteristically containing at least one metal whose negative free energy of oxide formation is numerically greater than 40 kcal./gm. atom of oxygen at 27° C.

14. The process of claim 13 wherein the dispersoid is a carbide.

15. The process of claim 13 wherein the dispersoid is a compound of an element selected from the class consisting of O, S, Se, Te, B, C, N, Si and P.

16. The process of claim 13 wherein the dispersoid particles are characterized by a volume concentration is at most 10%.

17. A dispersoid strengthened copper material, said material being the solidified product of a mixture of a predetermined concentration of refractory dispersoid particles and a continuous fused matrix containing copper as its characteristic ingredient, said continuous matrix wetting said refractory dispersoid, the particles of said dispersoid when in low concentration in the matrix when molten relative to said predetermined concentration naturally collecting into islands within which a predetermined interparticle spacing occurs and between which a predetermined inter-island rifting occurs, a preferred concentration of particles of said dispersoid being such that said predetermined interparticle spacing occurs throughout said molten matrix and no inter-island rifting occurs, in a range having an upper limit such that the actual interparticle spacing is no less than one hundred angstroms and a lower limit such that the concentration of said particles is no less than 15% below said preferred concentration by volume, and cooling to produce homogeneous solidification, said dispersoid characteristically containing at least one metal whose negative free energy of oxide formation is numerically greater than 40 kcal./gm. atom of oxygen at 27° C., said dispersoid being a compound of an element selected from the class consisting of O, S, Se, Te, B, C, N, Si and P, said characteristic volume concentration being such that $f=(\frac{1}{6}\pi d^3)/(D+D)^3$, where $f$=actual volume fraction of said dispersoid, $d$=actual average particle diameter, and $D$= actual average interparticle spacing.

18. The product of claim 17, wherein the dispersoid particles are characterized by at least one dimension of at most 0.9 micron, and volume concentration is at most 10%.

19. A dispersoid strengthened copper product, said product being the solidified product of a fused mixture of a predetermined concentration of refractory dispersoid particles and a fused matrix containing copper as its characteristic ingredient, said product containing a wetting agent for said refractory dispersoid, said wetting agent being selected from the class consisting of oxygen, sulfur, selenium and tellurium, said matrix having a eutectic formulation, said dispersoid characteristically containing at least one metal whose negative free energy of oxide formation is numerically greater than 40 kcal./gm. atom of oxygen at 27° C., said dispersoid being a compound of an element selected from the class consisting of O, S, Se, Te, B, C, N, Si and P, said dispersoid particles being characterized by at least one dimension of at most 0.9 micron, and volume concentration is at most 10%, said characteristic volume concentration being such that $f$ is approximately $(\frac{1}{6}\pi d^3)/(D+d)^3$, where $f$=volume fraction of dispersoid, $d$=average diamter, and $D$=average interparticle spacing.

20. The product of claim 19 wherein said dispersoid is composed of a carbide.

21. The product of claim 19 wherein said dispersoid is composed of $Al_2O_3$.

22. The product of claim 19 wherein said dispersoid is a carbon deficient carbide.

23. The product of claim 19 wherein said dispersoid is $Mo_2C$, wherein the C thereof ranges in concentration stoichiometrically from complete to deficient.

24. The product of claim 19 wherein said dispersoid is TiC, wherein the C thereof ranges in concentration stoichiometrically from complete to deficient.

25. The product of claim 19 wherein said dispersoid is VC, wherein the C thereof ranges in concentration stoichiometrically from complete to deficient.

26. The product of claim 19 wherein said dispersoid is WC, wherein the C thereof ranges in concentration stoichiometrically from complete to deficient.

References Cited

UNITED STATES PATENTS

| | | | |
|---|---|---|---|
| 2,183,592 | 12/1939 | Silliman | 75—153 |
| 3,180,727 | 4/1965 | Alexander et al. | 75—135X |
| 3,208,846 | 9/1965 | Bruma | 75—153 |
| 3,240,592 | 3/1966 | Bray | 75—154X |
| 3,323,911 | 6/1967 | Inoue | 75—153X |
| 3,286,334 | 11/1966 | Hay | 29—527.7 |

CHARLES N. LOVELL, Primary Examiner

U.S. Cl. X.R.

29—527.7; 75—135; 148—32